(No Model.)

D. FAHEY.
WHEEL.

No. 591,393.

Patented Oct. 12, 1897.

Witnesses
E. H. Monroe
J. F. Riley

Inventor
Daniel Fahey
By his Attorneys
C. A. Snow & Co.

UNITED STATES PATENT OFFICE.

DANIEL FAHEY, OF GRACEVILLE, MINNESOTA.

WHEEL.

SPECIFICATION forming part of Letters Patent No. 591,393, dated October 12, 1897.

Application filed May 7, 1896. Serial No. 590,637. (No model.)

*To all whom it may concern:*

Be it known that I, DANIEL FAHEY, a citizen of the United States, residing at Graceville, in the county of Bigstone and State of Minnesota, have invented a new and useful Wheel, of which the following is a specification.

My invention relates to wheels, and has for its object to improve the construction of wooden vehicle-wheels, whereby the ordinary tire-tightener may be dispensed with without depriving the wheel of means whereby looseness due to shrinkage of the rim may be taken up, said construction also providing for expansion of the rim without changing the shape of the wheel.

Further objects and advantages of this invention will appear in the following description, and the novel features thereof will be particularly pointed out in the appended claim.

Figure 1:
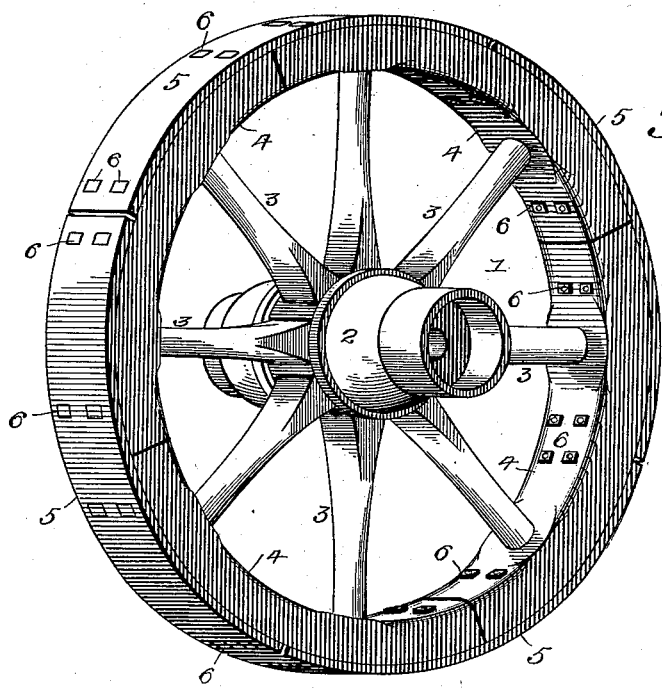
Figure 2:
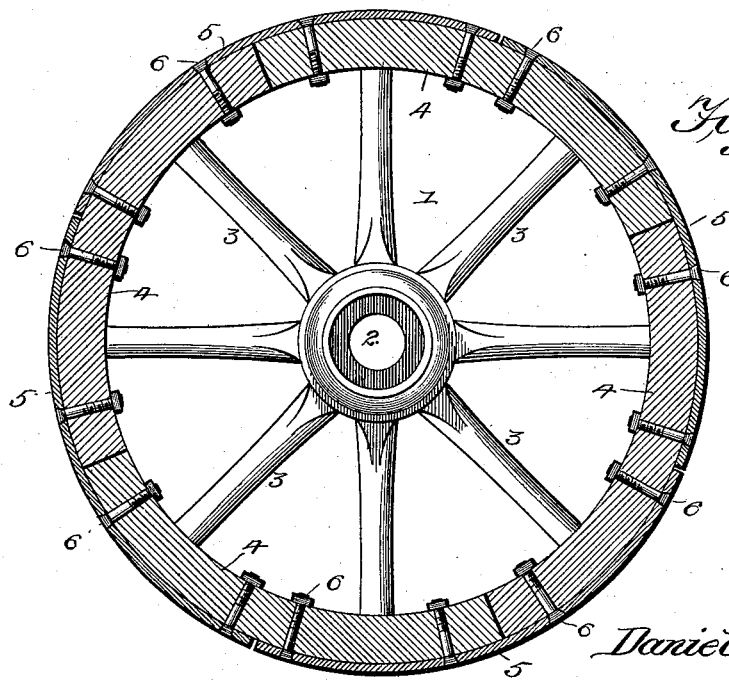

In the drawings, Figure 1 is a perspective view of a wheel constructed in accordance with my invention. Fig. 2 is a sectional view taken parallel with the plane of the spokes.

Similar numerals of reference indicate corresponding parts in both figures of the drawings.

The wheel 1 comprises a hub 2, spokes 3, a sectional rim or felly 4, of wood, the number of sections being preferably one-half the number of spokes, whereby each section spans two spokes, and a sectional tire 5. The joints between contiguous rim-sections are arranged approximately midway between the adjacent spokes, and hence as each section spans two spokes it is obvious that the joints will occur in the alternate intervals or in the spaces between the pairs of spokes respectively spanned by the rim-sections. The tire-sections are preferably equal in length with the rim-sections, and they are arranged to overlap the joints between the rim-sections, thus arranging the joints between the tire-sections midway between the joints of the rim or opposite the intervals between those in which the rim-joints occur.

When the wheel is first constructed, it is preferable to make the rim and tire sections of such lengths as to allow a slight space between the contiguous extremities thereof to provide for expansion and contraction of the rim-sections, the tire-sections being secured to the rim-sections by means of bolts 6 or their equivalents.

In case the shrinkage of the rim-sections, due to continued exposure to a dry atmosphere, exceeds the margin allowed by the interval between the contiguous extremities of the tire-sections one or more of the tire-sections may be removed and shortened by filing the ends thereof to provide the necessary interval for contraction. Unnecessary expansion and contraction of the wooden members of the wheel are prevented by treating the same before assembling the parts in boiled linseed-oil, as in the ordinary practice, and the metal parts, including the bolts, are preferably treated with red lead to avoid the decay of the wood contiguous thereto.

In assembling the wheel it is desirable to first subject the same, before tightening the bolts, to the pressure of a suitable clamping device, whereby the rim-sections are forced inwardly to their proper positions. After this preparatory contraction of the wheel the arrangement of the tire-sections, as above described, to overlap the joints between the rim-sections serves to lock the rim-sections firmly in the desired relative positions. A plurality of bolts is preferably arranged at each end of each tire-section and also a plurality of bolts at each extremity of each rim-section, whereby the extremities of the rim-sections are firmly bolted to the center of the overlapping tire-section, while the contiguous extremities of the tire-sections are similarly bolted to the center of the contiguous overlapped rim-section. This arrangement interlocks the various members of the wheel in such a way as to prevent springing or dishing and at the same time gives a yielding quality to the wheel, which enables it to withstand rough usage.

Having described my invention, what I claim is—

The improved wheel herein shown and described comprising a hub, spokes arranged in pairs, the wooden felly or rim made up of a series of sections treated with moisture-proof composition, and each section being a continuous arc-shaped piece having a pair of spokes secured thereto at points within its terminals, which are disposed at intervals midway between the spokes to which the felly-section is attached and adjacent pairs of spokes, the sectional tire fitted to the rim and composed of sections, each equal in length to the rim-sections, and arranged in alternate relation thereto, to break joints therewith, and to bring the terminals of the tire-sections to bear upon the solid parts of the rim-sections at points midway between the ends of said rim-sections, a series of bolts passing through the tire-sections near the ends thereof and the solid parts of the rim-sections, and other bolts passing through the ends of the rim-sections and the solid parts of the tire-sections; said tire-sections arranged to leave small spaces between the contiguous ends thereof to receive a suitable filling medium, substantially as described.

In testimony that I claim the foregoing as my own I have hereto affixed my signature in the presence of two witnesses.

DANIEL $\overset{\text{his}}{\times}$ FAHEY.
$\quad\quad\quad\text{mark}$

Witnesses:
 MIKE PINNANTGER,
 PETER SCHOUREDLER.